July 18, 1967 K. N. JOHNSON 3,331,913
CERAMIC-GLASS SEALING MEANS FOR ENCAPSULATION
OF ELECTRICAL DEVICES
Filed Feb. 8, 1965

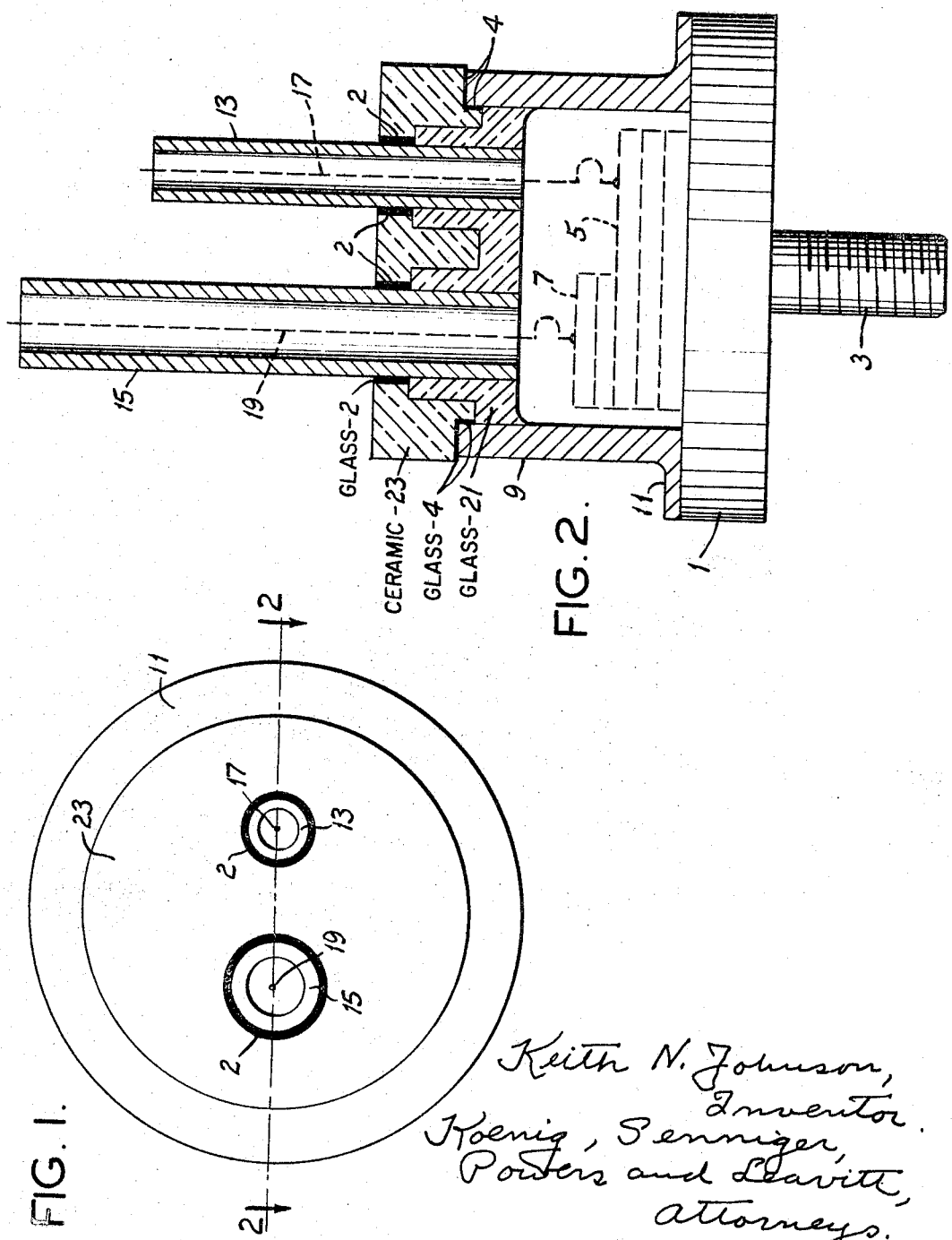

July 18, 1967
K. N. JOHNSON
3,331,913
CERAMIC-GLASS SEALING MEANS FOR ENCAPSULATION
OF ELECTRICAL DEVICES
Filed Feb. 8, 1965
3 Sheets-Sheet 3
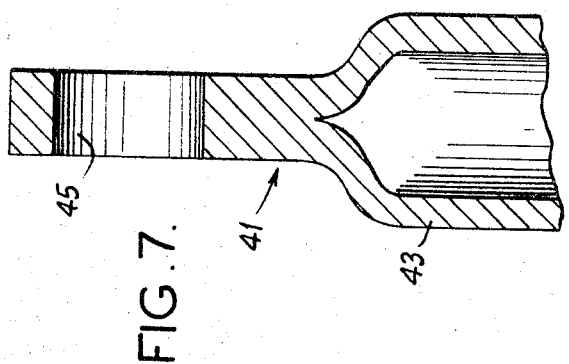
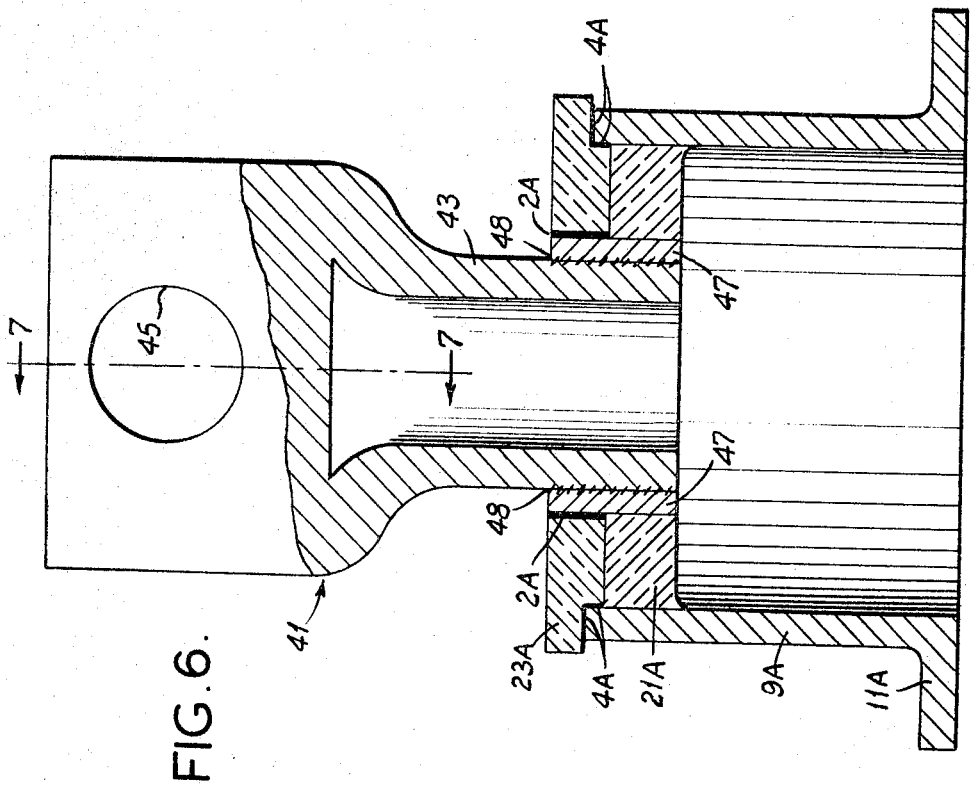

United States Patent Office 3,331,913
Patented July 18, 1967

3,331,913
CERAMIC-GLASS SEALING MEANS FOR ENCAPSULATION OF ELECTRICAL DEVICES
Keith N. Johnson, Cumberland, R.I., assignor to Texas Instruments Incorporated, Dallas, Tex., a corporation of Delaware
Filed Feb. 8, 1965, Ser. No. 430,950
3 Claims. (Cl. 174—52)

This invention relates to a sealing means for encapsulations of electrical devices, and with regard to certain more specific features, to an insulating seal for small, so-called packages, containing electronic devices such as silicon controlled rectifiers and the like.

The invention accordingly comprises the elements and combinations of elements, steps and sequence of steps, features of construction and manipulation and arrangements of parts which will be exemplified in the constructions and methods hereinafter described, and the scope of which will be indicated in the following claims.

In the accompanying drawings, in which several of various possible embodiments of the invention are illustrated, FIG. 1 is an enlarged plan view of one form of a container made according to the invention;

FIG. 2 is a cross section taken on line 2—2 of FIG. 1, certain parts being shown in elevation and certain contained parts by dotted lines;

FIG. 6 is a view similar to FIG. 2, showing another form of the invention; and

FIG. 7 is a cross section taken on line 7—7 of FIG. 6.

Corresponding reference characters indicate corresponding parts throughout the several views of the drawings.

Figure 5:
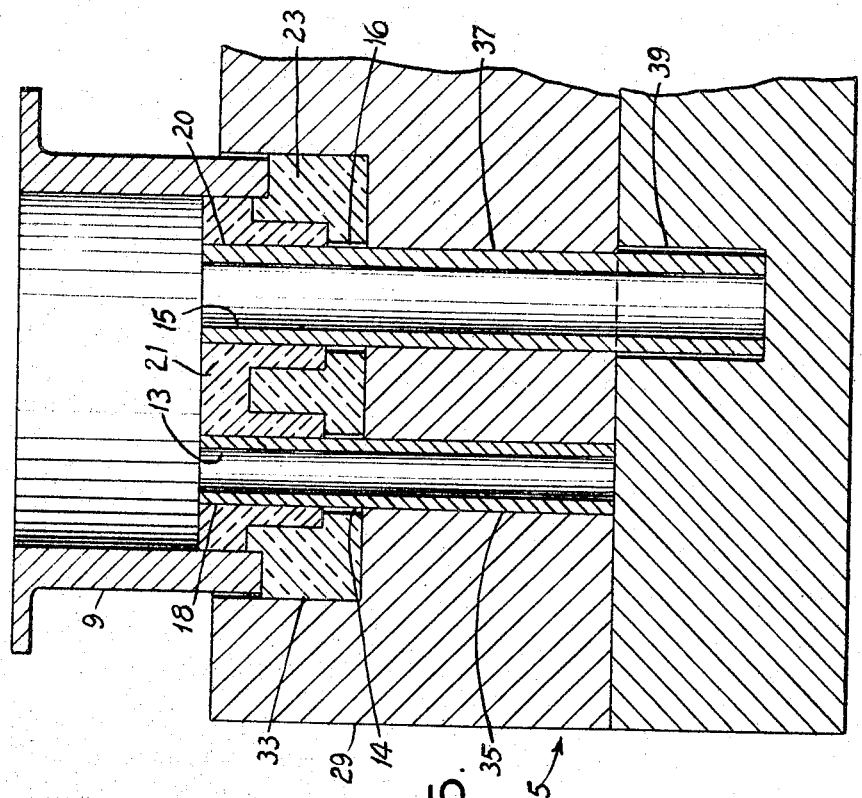
FIG. 5 is a cross section taken on line 5—5 of FIG. 3, but in addition showing in the fixture parts which are to be fused, this view being on the scale of FIGS. 1 and 2.

Various small electronic parts are required to be hermetically sealed in rigid packages as, for example but without limitation, the component parts of silicon controlled rectifiers. Not only is it desirable that the packages be as small as possible, in keeping with the smallness of their contents, but that they should be strong and accurately shaped. In attaining these ends, their costs should be minimized as much as possible.

It has been the usual practice to introduce an electrical lead or leads to the components within a package through a metal cover which is welded to a support. Introduction was accomplished through a metal sleeve or sleeves which passed through an all-glass closure seal. Certain glasses are useful for this purpose in that their coefficients of thermal expansion match those of certain metals, such as for example Kovar, to which they may be bonded by fusion to form a hermetic seal, without compressing the glass. However, Kovar is costly and the glasses as formerly used are subject to the disadvantage that under direct impact they may crack and admit contaminants to the package. Moreover, certain glasses (particularly soda lime glass) have a tendency at their surfaces to absorb water molecules from the atmosphere, thus being prone to voltage breakdown due to voltage creep over a given length of voltage path. Moreover, most glasses as ordinarily applied in seals had low thermal shock resistance.

All ceramic seals have also been proposed but these likewise have been found less satisfactory than desired because of certain difficulties encountered in bonding a ceramic to metal. By means of the present invention, which combines an armoring ceramic component with a compression glass seal component, the above-mentioned disadvantages are overcome, without the use of expensive material such as Kovar.

Referring now are more particularly to FIGS. 1 and 2 of the drawings, there is shown at numeral 1 a part of a package in the form of a typical conductive support (copper, for example) having a threaded extension 3 for attachment to apparatus which is to be served by the assembled package. The support 1 carries the typical parts to be packaged, such as, for example, a silicon element 5 and a copper element 7. These are shown diagrammatically in dotted lines. At numeral 9 is shown a peripherally disposed steel container wall or sleeve having a flange 11. Sleeve 9 is circular in cross section but may be of other appropriate shape, the flange 11 being shaped accordingly. The flange is welded to the support 1, thus forming a hermetically sealed connection. The sleeve 9, including flange 11, may be composed of cold-rolled steel such as SAE 1113, 1010 or the like. It will be understood that sleeve 9 could be made integral with support.

At numerals 13 and 15 are shown typical metal tubes for accommodating signal leads 17 and 19. The leads 17 and 19 are shown diagrammatically by dotted lines. The tubes 13 and 15 may for example be composed of No. 52 alloy, which consists of 52% nickel and the balance iron. The insides of these tubes are commonly tinned or otherwise provided with a comparatively soft internal surface, so that when (as is the practice) the ends of the tubes are pinched around the leads 17, 19, the inside of the finished package becomes hermetically sealed off from the ambient atmosphere. Heretofore an uncompressed, all-glass sealing member was employed between tubes such as 13, 15 and the sleeve 9. It is to improvement on this type of seal to which the invention is directed.

According to the present invention, there is shown at numeral 21 a compressed glass component having a boss for each tube and at numeral 23 a nonporous ceramic component having recesses for telescopically containing the bosses to form the composite seal. How the glass is compressed will appear. The glass component 21 is bonded to the metal sleeve 9 and to the metal tubes 13 and 15. The ceramic component 23 is bonded only to the glass component 21 and not to the metal sleeve 9 or either of the metal tubes 13 and 15. Ceramic component 23 forms an overlay or armor for the glass component 21.

Important to reliability is attainment of a substantial match between the coefficient of thermal expansion of the glass and of the ceramic components so as to avoid induced stresses therebetween, such as might cause fracture of the interface between the glass and ceramic. Typical combinations which have been successful for the components 21 and 23 are as follows, but it will be understood that these do not exhaust such combinations:

TABLE OF SOME USEFUL GLASS-CERAMIC COMBINATIONS

| Glass Component 21 | Ceramic Component 23 |
|---|---|
| Mansol No. 63-000 (soda-lime) | Forsterite ($2MgO.SiO_2$). |
| Corning No. 7052 (boro-silicate) | Zircon ($ZrO_2.SiO_2$). |
| Mansol No. 50-000 (boro-silicate) | Do. |
| Feroxcube No. 95 (soda-lime) | American Lava Steatite No. 35 or 645 ($MgO.SiO_2$). |
| Corning No. 9010 (soda-lime) | Do. |
| Mansol No. 40-000 (soda-lime) | Do. |
| Mansol No. 80-000 (soda-lime) | Alumina (98% $Al_2O_3$) with traces of iron silica. |

In the above table, the word Mansol refers to a product of Mansol Ceramics Company, Belleville, N.J.; the word Corning to a product of Corning Glass Works, Corning, N.Y.; the word Feroxcube to a product of Feroxcube Corporation of America, Saugerties, N.Y.; and American Lava to products of American Lava Corporation, Chattanooga, Tenn. The differences between American Lava No. 35 and 645 relate primarily to non-critical differences in densities. It will be understood that there are other useful combinations of glasses and ceramics, of which those in the table are illustrative. In the above table each ceramic component on the right is more refractory than the opposite glass component on the left but the glass and the ceramic of each pair have substantially equal coefficients of thermal expansion. On the other hand, the coefficient of thermal expansion of the glass is less than that of the steel of the sleeve 9. These are important concepts of the invention.

It will be understood that ceramic component 23 may be a glass component or a glass-ceramic mixture so long as it is more refractory than component 21. By more refractory is meant that its viscosity at any given temperature is greater. Glass component 21 may be a glass-ceramic mixture which is less refractory than component 23.

Figure 3:
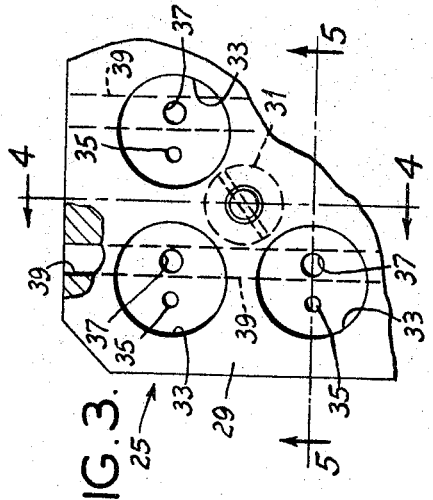
FIG. 3 is a fragmentary plan view of a fixture for fusing operations, being on a reduced scale.
Figure 4:
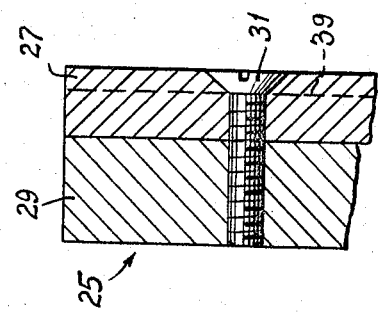
FIG. 4 is a cross section taken on line 4—4 of FIG. 3.

The mode of assembly by fusion is illustrated in FIGS. 3-5, which show a typical refractory fixture numbered 25 in general. The fixture shown comprises graphite plates 27, 29, held together by screws, one of which is shown at 31. The plate 29 is provided with a number of pockets 33, through the bottoms of which are formed openings 35 and 37. These are for the reception of the tubes 13, 15, respectively. Since the tubes 15 are longer than the tubes 13, the plate 27 is provided with grooves 39 for receiving the longer ends. The parts are assembled in the fixture 25 as follows (see FIG. 5):

First the ceramic member 23 in the pellet form shown in FIG. 5, with holes 14 and 16 for the tubes 13 and 15, respectively, may be dropped into one of the pockets 33, followed by the sleeve 9. Then the glass member 21 in pellet form may be dropped into place. It also has holes 18 and 20 for the tubes 13 and 15. This may be followed by insertion of the tubes 13 and 15. The order of insertion may be changed. Then the fixture with its contained parts is placed in a furnace at a temperature of approximately 1900° F., which will expand sleeve 9 and fuse or melt the glass of member 21 but not the ceramic of member 23. This causes the glass to wet and bond to the heat-expanded metal sleeve 9 and to the tubes 13 and 15. Gravity causes the glass to infill the spaces 14 and 16. The final result of this is shown by the very black areas at 2 on FIG. 2 which represent the thick regions in which glass has been transported by gravity from the main mass of glass of pellet 21 and extending therefrom without separation. Capillary action also causes glass to creep between members 9 and 23. The final result of this is shown by the thinner black lines 4 on FIG. 2, which represent the thin regions in which glass is transported by creep from the main mass of glass of pellet 21 and extending therefrom without separation. The thicknesses of the integral glass extensions or flows 2 and 4 from glass pellet 21 are exaggerated and shown in black for purposes of description and illustration. As illustrated in FIG. 2, flows 2 and 4 are comparatively thin relative to the thick pellets 21 and 23. Ceramics of the class above identified have approximately a 30% glassy phase. Wherever the melted glass of 21 wets the ceramic 23, the two bond together by diffusion between the glass and the glassy phase of the ceramic. The bonding mechanism is believed to be not only a glassy phase interaction between the glass and the glassy phase within the ceramic, but also a mechanical interlocking at the interface between 21 and 23.

After fusion, the fixture is removed from the furnace and cooled, whereupon the glass 21 and the ceramic 23 solidify. The glass and ceramic, having substantially equal coefficients of thermal expansion, shrink at the same rate, the glasses and ceramics being chosen for that purpose. Further cooling after solidification causes the solid shrinking steel sleeve 9 to apply hoop stress or compression on the finally solid glass seal 21. This is because the coefficient of thermal expansion of the steel exceeds that of the glass. The radial pressure on the glass is on the order of 10,000 to 20,000 p.s.i., depending upon the particular metal constituting the sleeve 9. As FIGS. 3-5 suggest, one fixture is constructed to fire a number of assemblies.

After cooling, each rigid assembly 9, 11, 21, 23, 13, 15 is removed from the fixture 25. After the leads 17 and 19 have been threaded through the tubes 13 and 15 and attached to members 5 and 7, the flange 11 is welded to the support 1 in covering position over the parts 5 and 7. Thereafter the tubes 13 and 15 may be crimped on the leads 17 and 19 to complete the hermetic sealing and packaging of the parts 5, 7. Further details in this regard are unnecessary, being known.

The advantages of the invention will now be clear, in view of the above and the following:

(1) With former all-glass uncompressed seals it was the custom to employ a material such as Kovar for attachment to the glass 9, so as to obtain matched coefficients of thermal expansion between the sleeve and glass. Kovar, in comparison with steel, is expensive.

(2) The new compression seal between the steel or comparable sleeve or shell 9 and the insulating glass component 21 creates a stronger and more reliable bond with the glass.

(3) Since the ceramic insulating component 23 has a coefficient of thermal expansion substantially matched to that of the glass component 21, interfacial stresses are small or nonexistent. The component 23, being exteriorly located, armors the glass against breakage from shocks caused by exterior blows. In fact, it is possible even to chip the ceramic without developing ruinous cracks, as would be the case by applying similar blows to an all-glass seal.

(4) Since the ceramic insulating component 23 has a coefficient of thermal expansion matched to that of the glass component 21, they act as one in response to thermal shock, with less possibility of breaking the glass than was the case heretofore.

(5) The voltage paths between the tubes 13, 15 on the one hand, and the sleeve or shell 9 on the other hand, are across the ceramic surface, rather than a glass surface. The former has less tendency to encourage current leakage across such a path under a given voltage. Thus the ceramic has a better surface dielectric property than glass insofar as current leakage is concerned.

(6) The location of the ceramic member 23 as endwise armor for the glass sealing member 21 does not increase the diameter of the package, a desirable feature.

In FIGS. 6 and 7 is shown another form of the invention. The same numerals have been applied to parts which correspond functionally to those of the first form of the invention, except that the designation A has been added to each reference character in this form of the invention.

In this case the heavy black lines 2A and 4A again indicate areas in which glass has become extended by flow from the main mass of glass 21A. However, there is substituted in this form of the invention for the tubes 13 and 15 a single conductor 41 composed, for example, of copper. This has a sleeve portion 43, one end of which is open and the other crimped shut to form an eye such as shown at 45, the latter being for the purpose of making a suitable exterior connection. Fitted around the sleeve portion 43 is a sleeve 47 composed, for example, of No. 52 alloy. The parts shown in FIGS. 6 and 7 are fused together by employing a suitable fusing fixture, the nature of which (with suitable modifications) will be obvious from the description above given in connection with FIGS. 3-5.

Upon heating in the fixture as above described and subsequent cooling, the glass seal 21A will be compression-bonded with the shell 9A and diffusion-bonded with the ceramic seal 23A. At the same time, the copper sleeve portion 43 will become brazed to the alloy sleeve 47 as indicated at 48. The advantages of this form of the invention are the same as those given in connection with the FIGS. 1-2 form.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A container for an electrical assembly comprising a metal cylinder enclosing said assembly, said cylinder having an open end, at least one metal sleeve extending into said open end, said sleeve carrying a conductor connected to said assembly, and means for sealing said open end around said sleeve, said means comprising an inside circular glass pellet having a diameter slightly less than said cylinder and a boss having an aperture for the passage of said sleeve, said glass being fused to the sleeve and to the inside of the cylinder wall, and an outside circular protective ceramic pellet having an aperture for the passage of said sleeve, a recess for telescopically containing said boss and a diameter larger than the interior diameter of said cylinder, said ceramic being peripherally seated exteriorly of said glass on the circular end of said cylinder around said open end, said ceramic being bonded by a glassy phase to the glass, the interfacial regions between the ceramic and said cylinder and the ceramic and said sleeve respectively having relatively thin flows of glass from the glass pellet, the flow between the cylinder and ceramic being fused on one side to the cylinder, the flow between the sleeve and the ceramic being fused on one side to the sleeve, and each flow being bonded by a glassy phase on its other side to the ceramic, the pellets being comparatively thick relative to the thin flows.

2. A container as in claim 1 wherein the coefficients of thermal expansion of the glass and ceramic are substantially the same but less than that of the cylinder.

3. A container as in claim 2 wherein said glass has a lower fusing temperature than that of the ceramic, cylinder and sleeve.

References Cited

UNITED STATES PATENTS

| | | | |
|---|---|---|---|
| 2,089,541 | 8/1937 | Dallenbach | 174—152 |
| 2,138,660 | 11/1938 | Mann | 174—152 X |
| 2,206,489 | 7/1940 | Schedel | 174—50.61 X |
| 2,206,515 | 7/1940 | Scharfnagel | 174—50.61 X |
| 2,458,748 | 1/1949 | Stupakoff | 174—152 |
| 2,480,903 | 9/1949 | Charbonneau | 174—152 X |
| 2,794,059 | 5/1957 | Smith | 174—50.61 X |
| 2,992,513 | 7/1961 | Breadner | 65—154 X |

LARAMIE E. ASKIN, *Primary Examiner.*